Aug. 3, 1948.   S. REY   2,446,392
LUMINOUS TELETRACING SYSTEM
Filed May 5, 1945   4 Sheets-Sheet 1
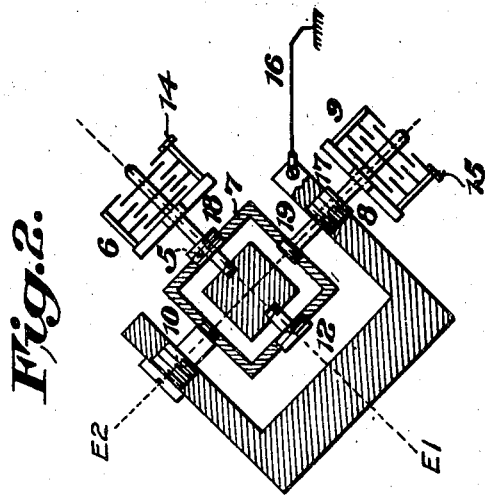
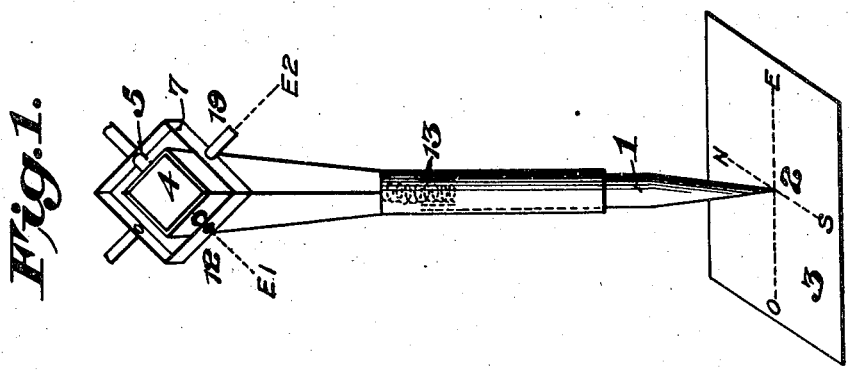
Inventor
Secundino Rey,
By
Attorney

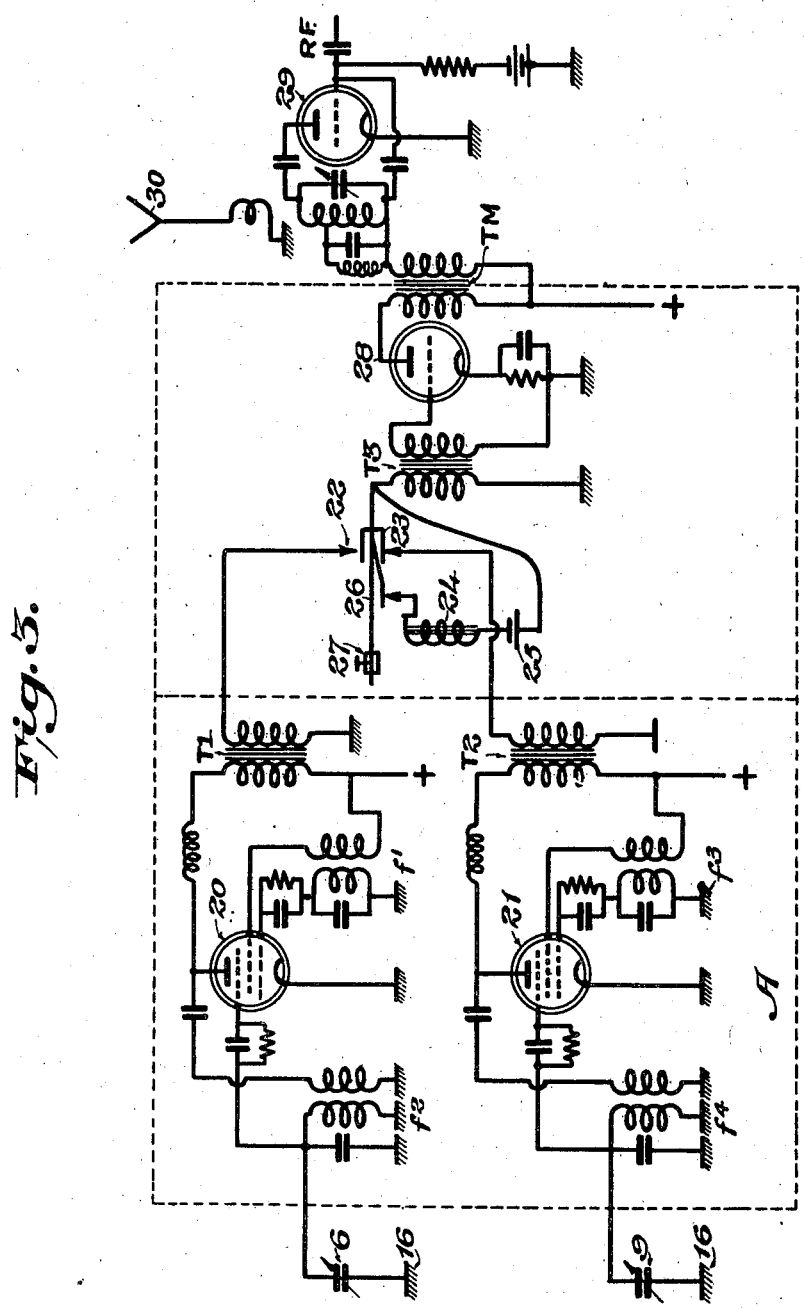

Aug. 3, 1948.    S. REY    2,446,392
LUMINOUS TELETRACING SYSTEM
Filed May 5, 1945    4 Sheets-Sheet 3
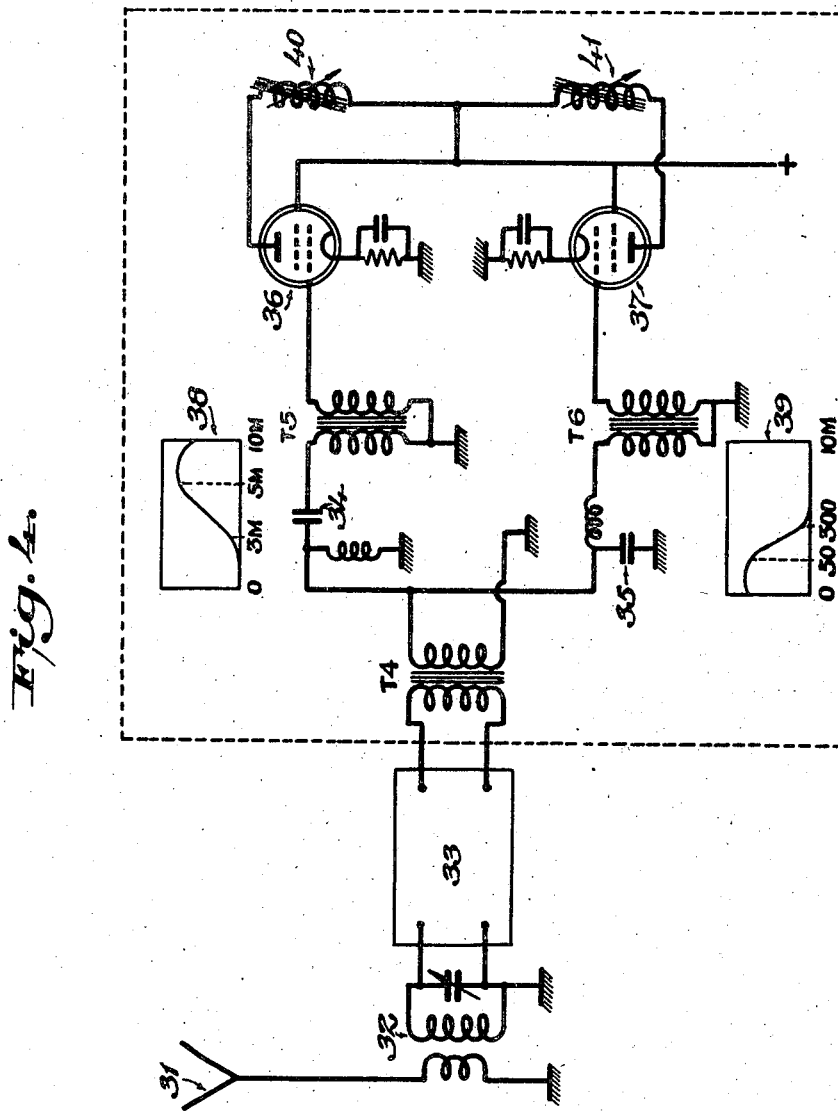
Fig. 4.
INVENTOR
Secundino Rey,
ATTORNEY Aug. 3, 1948.    S. REY    2,446,392
LUMINOUS TELETRACING SYSTEM
Filed May 5, 1945    4 Sheets-Sheet 4
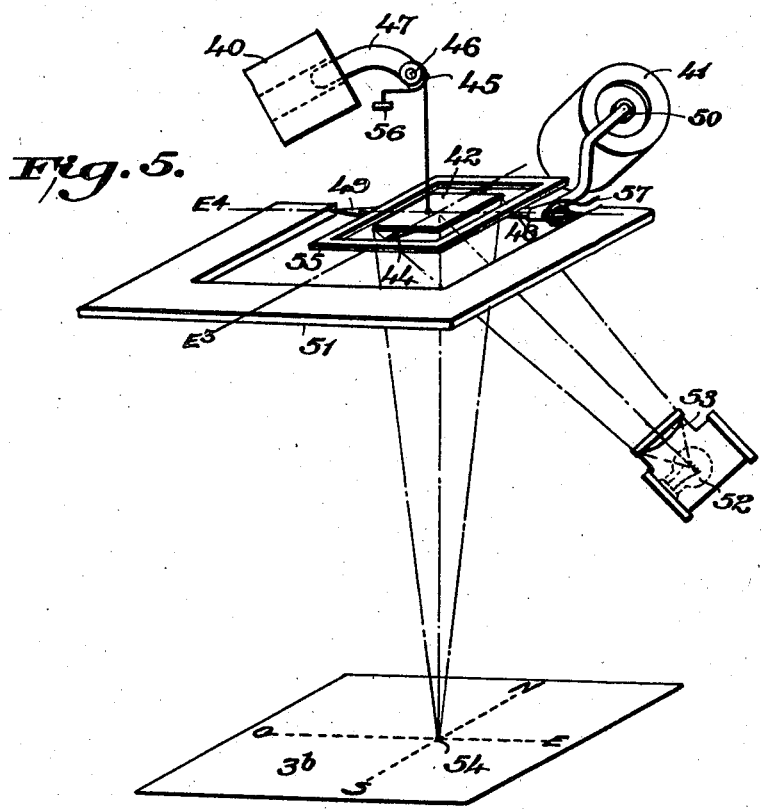
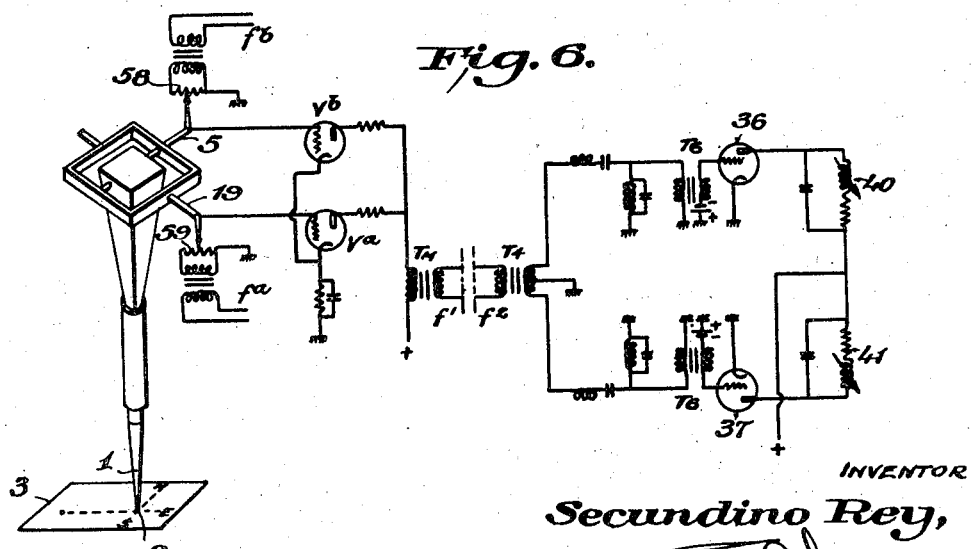
INVENTOR
*Secundino Rey,*
BY
ATTORNEY Patented Aug. 3, 1948

2,446,392

UNITED STATES PATENT OFFICE 2,446,392

LUMINOUS TELETRACING SYSTEM

Secundino Rey, Ramos Mejia, Argentina

Application May 5, 1945, Serial No. 592,240
In Argentina November 9, 1944

3 Claims. (Cl. 178—19)

1

The present invention relates to the electrical transmission to a remote distance of graphical representations or tracings. The invention consists in combining several elements for the purpose of performing in an inexpensive but efficient manner, the transmission of representations such as tracings, either by means of ordinary radio transmitting stations, such as broadcasting stations, or by telegraphic methods, between a transmitting station and a receiving station or stations, and thus obtain a transmission of intelligence consisting of traces drawn on a screen, these traces being instantly reproduced by all receiver or reproducer equipments using this system.

According to my invention, the delineation of a figure or object as it appears on a sheet is traced by a stylus, whose movements are resolved into two components which are mutually perpendicular, are converted into electric currents which are transmitted to a distant station, and at the distant station the electrical currents are reconverted into two mechanical movements which are recombined as components to actuate an optical system to visibly retrace at the receiving station, the delineated figure traced by the stylus at the transmitter. The subject traced by the stylus may be the path of a player on an athletic field or a horse on a race track.

What is seen on the receiver screen is not the player himself, but a luminous point representing him. Such luminous point may represent a ball, an athlete, or a race horse, and its movements are a true reproduction of those which gave rise to the movements on the screen of the transmitter or sender.

By introducing suitable improvements such as a reduction of size, and by providing the elements hereinafter to be described, the equipment may be adapted for military uses. In fact, from an aircraft which has been equipped with a particular chart in the sender, the pilot may instantly trace a line at the cooperating receiver, or plot a gun emplacement or the like on the chart at the receiving station by means of the luminous point. By this means, much time may be spared in the reception and interpretation of messages transmitted by reconnoitering aircraft or the like, which at present are sent by telephone or telegraph signals, and require a high degree of skill in order to avoid mistakes in the letters or numbers indicating longitude and latitude on the charts.

In connection with business or industrial advertising, this novel method will prove of considerable benefit, since its low cost places the same within the reach of everybody and the materials used in its construction are readily available and are not delicate and complicated, and do not require elaborate facilities for manufacture. In consequence, it will be seen that this system provides a kind of television for the public in general, and more than this, it is a system of slow action television, adapted for uses which may not be performed with the expensive cathode-ray tube sets, now in use for the television of pictures.

The receiver screen may be of any suitable or desired dimensions; for instance, in connection with equipment for home use, a size of about 25 x 40 cm. may be desirable, while for public meetings, screens which are 1, 2, or 3 meters square are preferable.

The assembled device consists of three essential parts or elements which must necessarily be used if a clear correspondence between the record on the sender screen and the record on the receiver screen is to be assured, or, in other words, between the person who sends the tracing and the person who is to receive the same at a remote distance.

These three elements are the following:

(1) A sender equipment proper, consisting of a screen and a pointer or stylus for tracing the delineated traces or curves or points to be transmitted;

(2) Adjustable electric circuit elements, operating to transform the positions of the stylus or pointer into electric currents corresponding with said positions and modulating a carrier frequency therewith, or simply transmitting on wire lines;

(3) A receiving set for these signals for transforming these signals into positions successively occupied by a luminous point on the receiver screen.

*Transmitting equipment.*—Above a glass or other screen carrying a drawing of a figure, is mounted an elevated support, or Cardan type of universal mounting, provided in the same plane with two pivotal mountings having mutually perpendicular axes designed for performing movements which may be designated north-south and east-west, respectively.

A telescoping extension member, ending in a point may be moved in all directions on the glass screen. This pointer I call an "artificial pencil," and it really amounts to such since the tracing performed thereby will be reproduced on the screen of each reproducer or receiving set.

Thus, any position occupied by this pointer will be represented by respective positions of the two frames of the Cardan system, one position may be designated N to S and the other from E to W.

At the transmitter, in order to obtain the transformation into corresponding position representing electric signal elements of each of the movements of the frame of the universal mounting, an electric circuit element is mounted for actuating each of the shafts which carry the movement, which converts this movement into variation of the frequency of the current produced in the oscillating circuit including these variable circuit elements, according to the position occupied by the pointer. The said electrical circuit elements consist preferably, of small variable condensers 9, 14 (Fig. 2). In the position of rest of the pointer 1, that is, when it points to the center of the screen, each condenser controls an electric current which generates alternating current of a predetermined frequency. When the pointer leaves this center position, the capacity and frequency of each circuit will be varied. It follows, therefore, that as the pointer approaches one side of the screen, say north, the frequency will be increased, while when approaching south, the frequency will be decreased. As the changes of frequency are in correlation with movements of the pointer 1, the transmitting or sender system is adapted for its purpose. Similar conditions will prevail in connection with the other direction of the screen, or the direction from east to west.

The equipment used for transforming these voltage impulses composed of different frequencies, into signal elements adapted for transmission by radio, consists in time division, by means of a compensated vibrator or tuning fork vibrating 10 to 20 pulsations per second, of the two frequencies (representing N–S and E–W), in order that only one of them may be transmitted at a given instant.

Having performed this separation, each frequency will be applied to modulate a transmitting circuit, so as to modulate its carrier, but with a constant amplitude.

The third unit or receiving set is provided with a display screen and consists of a galvanometer device with a universal double frame mounting, very sensitive and provided with a small mirror, adapted to assume the positions corresponding to the transmitting set. Every movement is controlled by a magnetic field, the strength of which is determined by the incoming frequency signal. A filter is also provided for selecting desired ones of the different frequencies, the value of the resultant varying in accordance with the position of the pointer at the transmitter.

In this way, when the frequency corresponding to the N to S direction is increasing, the induced magnetic field is decreased by the form of filter provided therefor at the receiver, and in consequence, the magnetic field of the output element of the receiving set which is to cause the movement from N to S, also decreases in intensity, and the mirror deviates or throws the light beam in the corresponding direction. The same thing applies to the movement of E to W.

The whole set operates by means of a current supply obtained either from a commercial source or from suitable primary or storage batteries.

At the receiver screen, a beam of light supplied by a suitable source is directed toward the galvanometer mirror with Cardan universal mounting, and thence it is directed as a spot on the screen. In consequence, every displacement which takes place of the galvanometer mirror will cause a corresponding displacement of the position of the luminous point on the screen.

By painting the inner side of the glass of the screen at the receiving set with a phosphorescent paint, so that the light concentrated at a point will energize the paint, it will be possible to trace letters or inscriptions on the sender set and cause said letters or inscriptions to appear for a short time on the screen of the receiving set.

If instead of a simple pointer, a photoelectric cell device be applied to the end of the pointer support, it will be possible to follow or trace anything in white and black existing on the sender screen, such as letters, maps, inscriptions, designs, photographs, etc., and reproduce the same on the receiver screen. This, besides the elements set forth, will require the modulation of the light beam at the receiving sets. Generally, by applying the photo-electric methods common to telephotography but using the present teletracing system as a mechanical part, a novel combination of telephotography will be secured which does not require synchronism.

In order to facilitate the understanding of my invention the same has been illustrated by way of example in the accompanying drawings, wherein:

Figure 1 is a diagrammatic representation of the Cardan universal mounting of the pointer of the transmitting set.

Figure 2 shows a detail of the means for transmitting components of motion to the electric circuit elements.

Figure 3 is a circuit for transforming the position of the pointer into different frequencies for transmission.

Figure 4 is a circuit diagram of the receiving set and the filter for separating the frequencies, as well as of the electronic tubes which control the energy of the motion translating solenoids.

Figure 5 shows the device for transforming the energy of the magnetic field into positions of the mirror, this latter device operating as a double acting galvanometer with Cardan mounting, so as to be similar to the arrangement of the transmitter set shown in Figure 1.

Figure 6 shows a modified form of transmitter and receiver which uses variable resistors.

With reference to Figures 1 and 2, there is shown the stylus or pointer 1, formed at its upper end with a rectangular terminal part 4 and carrying at its lower end a terminal portion 11 adapted to traverse the surface of the screen 3, being held constantly in contact with the same by its point 2. As the movement of the pointer is directed by hand, it will be possible, owing to the axes of the Cardan mounting being arranged in the same plane, to trace with the point 2 any design or tracing on the screen, or mark positions thereon. The interior of the pointer is hollow and is provided with a telescopic extension 13, which makes it possible for the point 2 to remain in contact with the screen 3 when the pointer is carried to its positions at the extreme edges of screen 3, in such cases it will be telescopically elongated to the necessary extent and in consequence, the point 2 of pointer 1 will always engage the screen 3, whatever be the position of the pointer.

The Cardan mounting may best be seen in Figure 2. The square terminal portion 4 of pointer 1 is provided with mounting pins or studs 5 and 12, to allow of movements in a given direction, say from E to W. A small frame 7 mounted freely on the pins 12 and 5, is provided with mounting stub shafts 10 and 19, arranged at 90° with regard to the studs 5 and 12.

These latter shafts 10 and 19 allow the other movements of the pointer 1. All the said pins and shafts are arranged in the same plane, represented by two geometrical axes E1 and E2.

Each pin or shaft is provided with its respective variable condenser, indicated in the drawings at 6 and 9, respectively. These condensers operate to modify their capacitance, according to the rotation of each pin or shaft. For instance, when the pointer 1 moves from say E to W, traversing the entire width of the screen, the variable condenser 6 will cause the capacity to vary between certain limits.

The frame 11 serves to support the entire transmitter assembly, including the Cardan mounting as well as the two condensers. The frame 11 is mounted, in turn, above the screen 3 by any suitable means, such as simple standards of light metal.

Figure 3 shows the circuit of the transmitter having its input from the condensers 6 and 9 and output to the transmitting antenna 30.

Referring again to Figure 2, it will be seen that the movable plates of condensers 6 and 9 are grounded to the frame by means of the lead 16. The condenser terminals 14 and 15 are connected to the oscillators $f2$ and $f4$, comprising pentodes 20 and 21, with their respective oscillatory circuits.

Referring to Figure 3, the combination of the results of the generation of oscillations $f1$ and $f2$ in one tube as 20 will furnish the pulses of currents of audiofrequency present in the transformer T1 of the plate circuit of a tube as 20. The inductances and capacities will be so adjusted as to produce a radio frequency $f2$ in the circuit 6, 16, and 20, which by beating with $f1$ will produce the audiofrequency which may be about 2500 cycles. As the capacity of condenser 6 varies, owing to the displacement of the pointer 1, say from E to W, the frequency generated as $f2$ will vary also, with the result that this beat frequency will be raised from 2,500 to 3,000 cycles or more, according to the extent of this displacement.

In connection with the circuit corresponding to pointer movement in the perpendicular direction as N-S, the same thing will occur in the circuits of tube 21, where frequency $f4$ is varied by the movements of the rotor of condenser 9, although in the latter case, the tendency will be to vary toward smaller frequencies, for practical engineering reasons. By varying the position of the pointer 1 in the direction from N toward S, the setting of condenser 9 will be changed, and the frequency produced at $f4$ will cause by beating with frequency $f3$ a signal pulsation of some 250 cycles, which will then decrease to about 50 cycles as the pointer 1 is moved in the direction N to S. Tubes 20 and 21 are combined double frequency oscillators and mixers. Tube 20 has one oscillating circuit shown on its right which produces a fixed radio frequency $f1$, and has a second oscillating circuit on its left which produces a variable radio frequency $f2$ which is varied by adjusting tuning element 6. The output from the plate of tube 20 delivered to transformer T1 is the beat frequency $f1-f2$, and $f1$ and $f2$ are so chosen that $f1-f2$ is a convenient audio frequency. Convenient values are $f1=100,000$ cycles, $f2=97,500$ cycles, and $f1-f2=2,500$ cycles.

As the setting of variable condenser 6 changes, $f2$ may change to 97.000 cycles, and $f1-f2$ to 3,000 cycles.

Similarly, tube 21 has one oscillating circuit on its right which produces a fixed radio frequency $f2$, and has a second oscillating circuit on its left producing a variable radio frequency $f4$, which is varied by adjusting tuning element 9. The output from the plate of tube 21 delivered to the transformer T2 is the beat frequency $f4-f3$, and $f3$ and $f4$ are so chosen that $f4-f3$ is a convenient audio frequency, substantially different from $f1-f2$. Convenient values are $f3=100,000$ cycles, $f4=100,250$ to 100,050 cycles, and $f4-f3=250$ to 50 cycles. These values are simply representative, and the frequencies $f1$ and $f3$ may be much lower or may be higher to meet particular conditions.

In view of the steady state existence in the transformers T1 and T2 respectively of continuous signals of different frequency, one of $f1-f2$ say 2,500 to 5,000 cycles, and the other of $f3-f4$ say 50 to 250 cycles, it will be necessary to make a time separation of the same for their radiation in very short separate time intervals. This result is obtained by means of a suitable vibrator, provided with a counterweight, as shown in detail in Figure 3 at 22, 23, 24, 25, 26, and 27.

By means of the coil 24 and battery 25, the blade armature 26 is caused to vibrate, the period of such vibration being controlled by the adjustable loading member 27. The mechanical vibrations may be from 10 to 30 per second; according to my experience a good result is secured by this value, and in this way, during one-half of the time of vibration, the transformer T3 will be connected to one of the frequencies, as that delivered say by transformer T1, and during the other half, to the other frequency as delivered by transformer T2. In effect, by means of the resilient blades carried by armature 26 and the contacts 22, 23, the primary of transformer T3 will intermittently be connected to T1 or to T2. The tube 28 will periodically amplify the respective signals of the output of transformer T1 and transformer T2, which for example may be 3,000 cycles and those of 50 cycles, but during separate time intervals, and said signals will be applied by means of a modulating transformer TM to the oscillator circuit generating radio-frequency waves, for radiation by the antenna 30, as continuous waves modulated by vary rapid pulses, each containing respectively signal energy of these two output frequencies which for example may be 3,000 cycles or 50 cycles.

Certain novel parts of the present invention are contained in the unit A enclosed in dotted lines in Figure 3, which is the system for converting the variations in the movements of the pointer 1 into different frequencies, and the unit B enclosed in dotted lines which represents the system for separating in the form of pulses, the two different frequencies which in turn may vary within a certain range, according to the position imparted to the pointer on the screen.

The radiofrequency wave generating circuit 29 is not new, per se, and the method here described may be applied to any of the known kinds of transmitters, either of the usual broadcasting type, or for short or ultra-short waves.

If necessary, the use of the transmitter 29 may be avoided and the modulating transformer TM may be applied to any telephone or telegraph wire line, without the aid of a radio set.

With reference to Figure 4, the receiver 33, by using the antenna 31, is tuned by means of its radio-frequency circuit 32 to the wave radiated by transmitting antenna 30. This receiver 33 may be of any conventional type. The arrangement for reproducing the transmitted trace is shown in Figure 4 and consists of a transformer T4, connected to two transformers T5 and T6, these latter being connected in turn to tubes 36 and 37.

Between the secondary of transformer T4 and the primary of transformer T5, a filter HPF which allows the passage of high frequencies is arranged, so that the transmission curve between 3,500 and 5,000 cycles will have substantially a rising straight line characteristic. At 38 (Fig. 4) the effect of this filter may be seen, which consists in that the circuit elements as condenser 34 will cut out all the energy of frequency less than 2,000 cycles, but will allow the passage of any frequency above 2,000 up to 5,000 cycles. In the circuit between transformer T4 and transformer T6 a similar thing occurs, except that the condenser elements 35 are arranged as low pass filters LPF for excluding the high frequencies and allowing the passage of the low ones. In this manner, any frequency component lower than 300 cycles will increase in volume level, as will be understood when referring to the diagram 39 (Fig. 4).

The respective tubes 36 and 37 will deliver a signal to the field windings 40 and 41 of the galvanometers, and cause therein a greater or lesser magnetic field, according to the intensity of the signal applied to the respective grids of tubes 36 and 37.

There remains to make use of the corresponding concentrated fields of the respective solenoids 40 and 41. In Figure 5 there is a small mirror 42, mounted between pointed pivots 44 and 49, with its respective axes E3 and E4, situated in the same plane. At a point 43, at a distance of about two millimeters, more or less, from the geometrical axis E3, a pivotal connection is provided with a small rod 45, and another pivotal connection 46 is provided at the other end of rod 45. It should be noted that the point 43 is spaced from the axis E3, but that it must be exactly located on the geometrical axis E4. The core member 47 of soft iron pivotally connected to rod 45 is attracted to a greater or lesser extent towards the interior of the solenoid winding 40 and will thus by action on rod 45 modify the position of the mirror 42, directing the concentrated beam of light 54 in a direction here considered to be toward the east or the west. The position occupied by the beam 54 on the receiver screen 3b will depend on the magnetic field induced in the solenoid 40.

The pivot 49 and pin 48 allow the frame 55 to move in a direction situated at 90° from the former one, so that the beam of light forming spot 54 will perform movements from N to S. This is obtained by means of the solenoid 41 and the soft iron core 50 therefor, connected to the pin 48 at an intermediate point as shown.

The solenoids 40 and 41 are held stationary with regard to the platform support 51. Their movable elements are the soft iron cores 47 and 50, which will be drawn in to a greater or lesser extent, according to the intensity of the current flowing through the solenoid windings 40 and 41 respectively. The restraining springs 56 and 57 hold the mirror at its "zero" position, for which no current flows through the solenoid windings 40 and 41.

A source of light 52 and its lens 53 supply a concentrated luminous point at 54 on receiver screen 3b, after being reflected by the galvanometer mirror 42.

As the movements to be produced of the galvanometer mirror 42 are of a magnitude of a few degrees only, and owing to a certain inertia being inherent in the movable elements, it follows that although a continuous field may not constantly be acting on solenoids 47 and 50, the light will notwithstanding be maintained at fixed points, owing to the fact that the change from pulses containing 300 cycles to another containing 3,000 cycles, will be performed at a rate of 10 to 20 times per second, and within this very brief interval a displacement of the galvanometer mirror 42 will not readily take place, as this latter has been designed for changes of ½ to ¼ of a second.

*Practical operation.*—Let us suppose that a transmitting set such as shown in Figures 1, 2, and 3 is installed at a football field. After establishing the necessary connections and when the observer reports a player kicking the ball toward the opponent's goal, the assistant will follow this movement tracing out the trajectory of the ball with his stylus or pointer 1 on the transmitting screen, on which in this case the playing lines of the playing field are drawn.

At the receiving set using the device in accordance with Figures 4 and 5, the luminous point which represents the ball, will move on the screen and exactly reproduce the movements of the transmitting pointer. Every movement of the ball will be followed by the luminous point, thus giving the spectator the impression of not only hearing the speaker as he reports the progress of the game, but alos following with his eye at every movement the movements of the ball, and so obtain a real impression of the incidents of the game.

In the modified form of transmitter and receiver represented in Figure 6, the teletracer is provided with variable resistance units. The objects of this is to obtain the same effect from the pointer 1, that is, cause variations of the electric voltage or current, replacing the two condensers 8 and 9 of Figure 2, which are fixed on the shafts 5 and 19 of the Cardan universal mounting, by two variable resistances 58 and 59 respectively, capable of assuming settings giving desired values of resistance, depending on the position of the pointer 1.

Under these conditions any position of the pointer represents a characteristic value of resistance, which controls the value of potential, which is taken advantage of to modify the frequency by a specified amount. If there is a direct and parallel relation between the variations of potential and the audiofrequency, this latter can, in its turn, modify the position of the galvanometer mirror 42 of the double system of galvanometers.

When the pointer 1 is carried to a certain position at the transmitter, automatically and instantaneously this is translated so that at the receiving station the position of the pointer is marked in the same particular position on the receiving screen by a luminous point.

It is not necessary to vary the frequency to obtain transmission of intelligence between the teletracer transmitter and the receiving set, it will only be necessary that a certain form of wave can be suitably modified.

The circuit employed in this case of Figure 6 is the following: to use conducting lines, apply to the line conductors an audiofrequency value of $f_a$ for the horizontal movement and $f_b$ for the vertical movement. A controlling tube which modifies the audiofrequency, has its grid connected to the potential determined by the variable resistance of the Cardan mounting system.

When the variations in the positions of the pointer cause the increase or reduction of the audiofrequencies in the line, the mirror of the galvanometer with the universal mounting is given corresponding variations in its positions. In the receiving set, the audiofrequency wave must be rectified, so that the result, that is, the continuous voltages of the different values, cause the relative galvanometer movements.

In Figure 6 is shown the complete set, including transmitting set and receiver, as well as all the lines of conductors.

For radio communications, the output transformer $Tm$ of Figure 6, is applied directly to the modulating system, obtaining in such a manner a set which can be used for a space channel.

It will be evident that in carrying this invention into practice, various modifications of construction and detail may be introduced, as also the manner of connecting the transmitter to the receiving set may be varied, and different electric circuit elements may be employed for attaining the same purpose, without departing from the principal features of my invention.

I claim:

1. In a telescriber system, a transmitting station comprising a stylus, Cardan universal mounting means for displaceably mounting said stylus and comprising two nested frames having connecting pivot shafts respectively lying in two mutually perpendicular co-planar axes, a pair of variable electrical impedance elements respectively mounted for adjustment by movements of said shafts, a pair of oscillators of different frequency ranges respectively comprising said impedance elements and adapted to have their output frequencies respectively varied by said impedance elements, time division duplex transmitting means adapted during alternate brief intervals to transmit the so varied outputs of said oscillators respectively, a receiving station comprising a light source and an electro-optical system having a mirror positioned to reflect a beam from said light source and further having Cardan universal mounting means for displaceably mounting said mirror, said last mentioned mounting means comprising two nested frames having connecting pivot pins respectively lying in two mutually perpendicular co-planar axes, individual electrical means for displacing each said frame, individual input paths for each of said electrical means comprising frequency selective units respectively adapted to transmit the two different frequency ranges of said oscillators, and signal translating means interconnecting said transmitting station and said receiving station and adapted to transmit the output of said time division multiplex transmitting means to said input paths of said receiving station.

2. A telescriber system according to claim 1 said means for displaceably mounting said mirror comprising a rod arranged for displacement by actuation of a said electrical means and being connected to said mirror at a point thereof lying in one said axis of displacement of said mirror but substantially removed from the other said axis of displacement of said mirror.

3. A telescriber system according to claim 1 said time division duplex transmitting means comprising an electrically driven vibrator having a frequency of the order of 10 to 20 vibrations per second.

SECUNDINO REY.

REFERENCES CITED

The following references are of record in the file of this patent:

UNITED STATES PATENTS

| Number | Name | Date |
|---|---|---|
| 714,577 | Gruhn | Nov. 25, 1902 |
| 2,094,052 | Aamodt | Sept. 28, 1937 |
| 2,186,252 | Little | Jan. 9, 1940 |
| 2,269,599 | Moodey | Jan. 13, 1942 |
| 2,274,638 | Rosene | Mar. 3, 1942 |